Figures 1, 2:
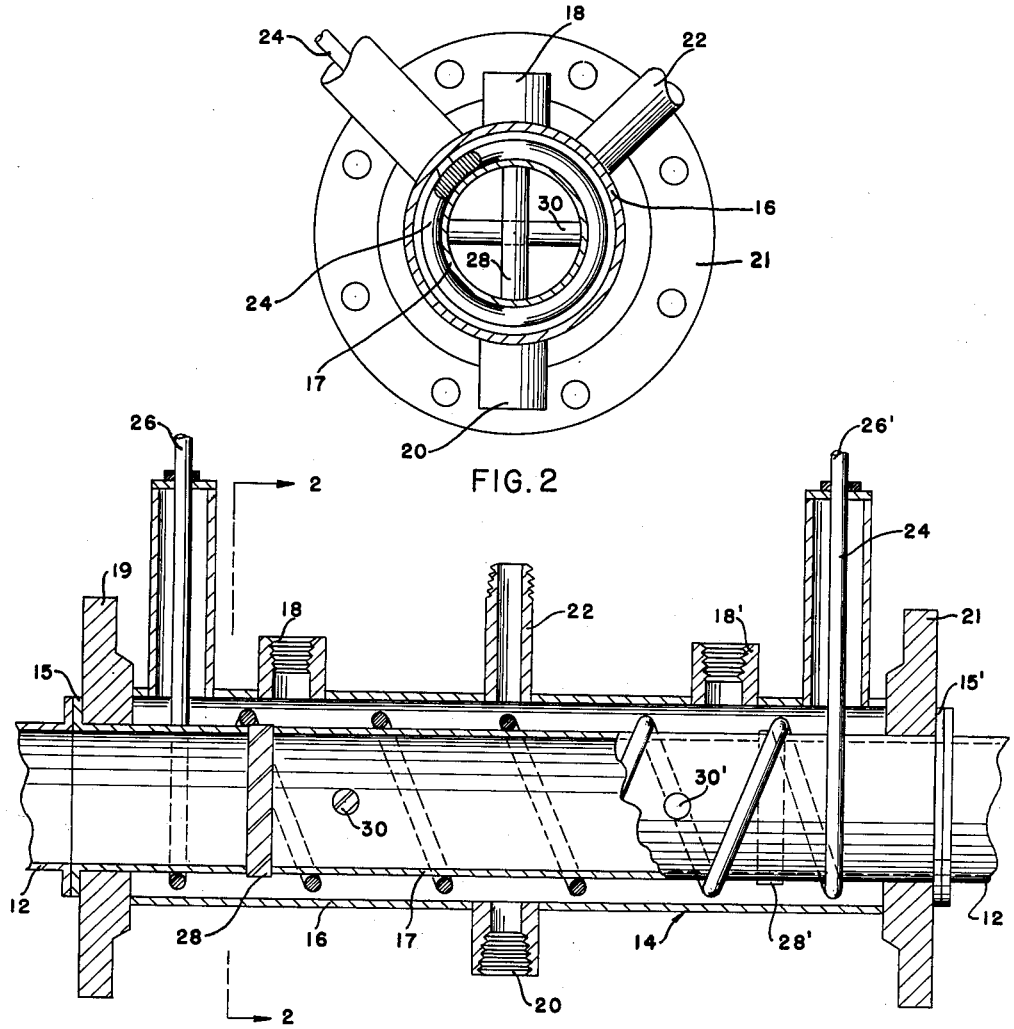

Nov. 8, 1955 — W. J. BUTLER ET AL — 2,723,108
VALVE
Filed Feb. 24, 1951

INVENTORS
WILBURN J. BUTLER
MAURICE C. SULLENDER
CHESTER C. BRUMBAUGH
BY

> United States Patent Office 2,723,108
Patented Nov. 8, 1955

2,723,108

VALVE

Wilburn J. Butler and Maurice C. Sullender, Houston, Tex., and Chester C. Brumbaugh, Painesville, Ohio, assignors to Diamond Alkali Company, Cleveland, Ohio, a corporation of Delaware Application February 24, 1951, Serial No. 212,583

3 Claims. (Cl. 257—6)

This invention relates to valves for controlling the flow of a liquid through a line, conduit or pipe, and more particularly relates to such valves in which frozen liquid contained in the line comprises the valving instrumentality. The invention is adapted for use in connection with all types of liquids, but is particularly suitably applied in the control of flow of highly corrosive liquid materials where ordinary mechanical valves are subject to such severe corrosion that the continual replacement of the valves becomes an economic burden. An example of such a situation is in lines or conduits carrying molten anhydrous caustic soda.

The control of liquid-filled lines by cooling has heretofore been proposed, though normally these proposals have not been directed to the use of the frozen liquid as a valving means. Thus, it has been suggested to locate leaks in oil-filled cables by freezing on either side of the leak and narrowing the gap between the frozen zones, whereby only a small amount of the oil in the cable is lost in discovering the leak. These prior art suggestions do not envision the problem of handling flowing liquids, particularly highly corrosive liquids, and, hence, have not been suggestive of the present invention which has solved a long-felt need, especially in the field of control of the flow of molten liquid anhydrous caustic soda.

The present invention contemplates the provision of a suitable zone in a line containing flowing liquid provided with means for heating and cooling the same, which means are associated with the line carrying the liquid in a manner to assure the positive formation of a sufficient volume of frozen material in the line, to insure that in addition to a mere skin of frozen material which in some forms of the invention deposits initially, a solid plug of frozen material will be formed whereby the flow of liquid can be stopped. In addition, the invention contemplates the provision of means to prevent the movement of partially melted, relatively large particles of solid material out of the heated zone and through the lines, since the movement of such solid material into a joint or elbow in the line would, as can be easily seen, cause difficulty in the management of the liquid in the line.

It is an object of the invention to provide valves, particularly for corrosive liquids, in which no moving parts whatsoever are involved.

Another object of the invention is to provide valves for liquids which shall comprise a frozen portion of the liquid itself.

It is another object of the invention to provide valves for liquid flowing through a line comprising positively positioned solidified liquid to be valved.

It is a still further object of the invention to provide in such structures, means to heat such frozen material rapidly and efficiently in order completely to melt the same in a minimum amount of time, and also to provide means for rapidly and efficiently transferring heat away from a point of a line to be frozen, whereby flow in the line can be stopped or started on relatively short notice.

In pursuance of these and other objects of the invention, the following detailed description of preferred embodiments of the invention is offered, which description includes the drawings, in which, Fig. 1 is a longitudinal, vertical section partly in elevation of one structure of the invention, Fig. 2 is the section taken on the line 2—2 of Fig. 1.

Referring now to the drawings, in Figs. 1 and 2 is illustrated a form of the invention suitable for various applications and particularly useful in the valving of liquid materials having relatively good heat transfer characteristics in the solid state, such as metallic materials. The line 12 is interrupted by insertion of the valve of this form of the invention shown generally at 14, suitable flanged connection 15, 15' being provided at the points of interruption. Valve 14 includes jacket 16, secured to flanges 19 and 21, which in turn abut and are secured to the flanged connections 15 and 15', which may be provided with entering ports 18, 18' for coolant and exit port 20. If desired, a well 22 for a thermocouple may also be included. In addition to means for bringing coolant into the valve zone, there is provided heating unit 24, which may be a "Calrod" unit or the like, the ends 26, 26' of which may be secured to a suitable source of heat energy not shown. Vertical metal rods 28, 28' are provided adjacent each end of the zone and, in addition thereto, similar horizontal rods 30, 30' are provided as shown. Preferably the rods 28, 28' and 30, 30' are positioned so that one end thereof is juxtaposed to the point of passage of the helices of the heating unit on the outside of tube 17, so that highly efficient heat exchange between the heating unit 24 and the rods 28, 28' and 30, 30' is provided.

The operation of the device is simple and may conveniently be described in connection with the valving of molten anhydrous caustic soda, though as noted above, the invention is in no way limited to the specific material flowing in the line 12. Where it is desired to interrupt the flow of caustic soda in line 12 for any reason, coolant, such as low pressure steam of the order of 150 lbs. or less, is introduced at the ports 18, 18' into the jacket 16. Because of the passage of the metal rods 28, 28' and 30, 30' through the liquid-containing tube 17, highly efficient heat transfer between the relatively cool area within the jacket 16 and the interior of the tube 17 is immediately set up. A skin of caustic soda forms on the interior of the tube 17 but, in addition, due to the heat exchange feature of the rods 28, 28' and 30, 30', a plug of solid caustic soda forms in a relatively short time, such as 30 seconds, and the flow of the material through the line 12 is effectively blocked off. It will be observed that when the flow has been blocked, a solid plug of caustic soda in the line is the actual valve instrumentality and will withstand considerable pressure in the line, especially due to the positive holding of the plug by the rods 28, 28' and 30, 30'.

Where it is desired to release the valve, the ports 18, 18' are preferably closed, and the heating unit 24 is energized, whereby heat is applied to the area of the tube 17 between the ends of the heating unit helices. In particular, highly efficient heating of the rods 28, 28' and 30, 30' is brought about by the proximity of at least one end of each rod to the heating unit itself. Melting of the caustic soda on the skin of the interior of the tube 17, of course, occurs initially and but for the rods 28, 28' and 30, 30', might in some cases result in a plug of partially melted material moving down the tube and out of the heating zone. Thus, when such a partially melted plug encounters a joint or elbow in the line, undesired freeze-up would occur, whereby operations would be interrupted. By means of the rods 28, 28' and 30, 30', however, the melting plug of caustic soda is held in position in the heating area until the plug is reduced to a size which will readily flow through the line and not cause freeze-ups at joints or elbows.

As noted above, the invention is applicable to all types of freezable liquids, the explanation in connection with molten caustic soda having been used only to demonstrate the use of the invention in conditions of high corrosion and difficulty of operation.

While there has been described an embodiment of the invention, the apparatus described is not intended to be understood as limiting the scope of the invention as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A valve for use in controlling the flow of freezable liquids, said valve comprising an imperforate-walled conduit, a heat transfer jacket surrounding said conduit, at least two longitudinally spaced rods extending completely through said conduit, said rods being alternatingly disposed at different angles about the longitudinal axis of said conduit, means circulating cooling fluid through said jacket to freeze liquid within the conduit thereby forming a valve plug, a helical heating coil surrounding said conduit within said jacket, said coil being in contact with the exterior of said conduit and with said rods thereby to establish a heating zone around said conduit within said jacket and at least two direct heat transfer paths through said rods to the interior of said conduit whereby upon application of heat to said heating coil the previously formed valve plug is melted to permit fluid passage through said conduit.

2. A valve according to claim 1 wherein the heating coil comprises an electrical resistance heating element.

3. A valve according to claim 1 wherein the said rods are alternatingly perpendicular to each other.

References Cited in the file of this patent

UNITED STATES PATENTS

| Re. 10,543 | Ryan | Dec. 9, 1884 |
| 1,817,214 | Stuckwisch | Aug. 4, 1931 |
| 1,906,636 | Schlecker | May 2, 1933 |
| 1,945,549 | Harter | Feb. 6, 1934 |
| 1,949,374 | Johnson | Feb. 27, 1934 |
| 2,257,727 | Bennett et al. | Oct. 7, 1941 |
| 2,320,506 | Bennett et al. | June 1, 1943 |
| 2,439,592 | Wallgren et al. | Apr. 13, 1948 |
| 2,483,082 | Young et al. | Sept. 27, 1949 |
| 2,508,988 | Bradley | May 23, 1950 |

FOREIGN PATENTS

| 919,082 | France | Feb. 26, 1947 |